United States Patent
Hinds et al.

(10) Patent No.: US 11,984,230 B2
(45) Date of Patent: May 14, 2024

(54) DUAL-MODE HEAT REMOVAL SYSTEM THAT ALLOWS FIRST DIRECTION NATURAL CIRCULATION FLOW THROUGH A HEAT EXCHANGER DURING NUCLEAR REACTOR EMERGENCY COOLING AND ALLOWS OPPOSITE DIRECTION FORCED FLOW THROUGH THE HEAT EXCHANGER DURING DECAY HEAT REMOVAL

(71) Applicant: GE-Hitachi Nuclear Energy Americas LLC, Wilmington, NC (US)

(72) Inventors: David H. Hinds, Wilmington, NC (US); Charles L. Heck, Wilmington, NC (US)

(73) Assignee: GE-Hitachi Nuclear Energy Americas LLC, Wilmington, NC (US)

( * ) Notice: Subject to any disclaimer, the term of this patent is extended or adjusted under 35 U.S.C. 154(b) by 324 days.

(21) Appl. No.: 17/131,273

(22) Filed: Dec. 22, 2020

(65) Prior Publication Data

US 2022/0199271 A1 Jun. 23, 2022

(51) Int. Cl.
*G21C 15/18* (2006.01)
*G21C 15/24* (2006.01)
(Continued)

(52) U.S. Cl.
CPC ........... *G21C 15/182* (2013.01); *G21C 15/24* (2013.01); *G21C 15/25* (2013.01); *G21C 15/257* (2013.01)

(58) Field of Classification Search
CPC .............................. G21C 15/182; G21C 15/24
(Continued)

(56) References Cited

U.S. PATENT DOCUMENTS 3,285,824 A * 11/1966 Ageron .................. G21C 15/24
376/298
3,400,047 A * 9/1968 Howard ................. G21C 15/25
376/372
(Continued)

FOREIGN PATENT DOCUMENTS

JP 2013-140079 7/2013
KR 10-1072803 10/2011

OTHER PUBLICATIONS

WIPO, International Search Report in corresponding PCT Application PCT/US2021/064380, dated May 2, 2022.
(Continued)

*Primary Examiner* — Jack W Keith
*Assistant Examiner* — Daniel Wasil
(74) *Attorney, Agent, or Firm* — Ryan Alley IP

(57) ABSTRACT

Piping loops can carry either forced or natural circulation coolant flow from and back to a nuclear reactor depending on reactor and coolant state, and can transition between the two. The loop flows into a heat exchanger that cools the coolant and may even condense the coolant. The heat exchanger can drive natural circulation coolant flow, and a pump on the loop can drive forced circulation. Coolant direction may be reversed through the heat exchanger in different modes. Loops may be installed directly on existing isolation condenser systems or come off of a primary loop generating electricity commercially. Actuation valves may isolate and actuate the system merely by disallowing or allowing coolant flow. Different flow modes and coolant direction may be similarly achieved by pump actuation and/or valve opening/closing. Beyond the pump and simple valve actuation, loops may be entirely passive.

19 Claims, 3 Drawing Sheets

(51) Int. Cl.
*G21C 15/25* (2006.01)
*G21C 15/257* (2006.01)

(58) Field of Classification Search
USPC .......................................... 376/283, 299, 402
See application file for complete search history.

(56) References Cited

U.S. PATENT DOCUMENTS

| | | | | |
|---|---|---|---|---|
| 3,575,807 | A * | 4/1971 | Ripley | G21D 1/04 376/372 |
| 3,888,734 | A * | 6/1975 | Juric | G21C 1/326 376/298 |
| 4,136,644 | A * | 1/1979 | Tratz | G21D 5/08 376/402 |
| 4,188,173 | A * | 2/1980 | Lindsay | F04D 15/0022 417/424.1 |
| 4,753,771 | A * | 6/1988 | Conway | G21C 15/18 376/283 |
| 4,830,815 | A * | 5/1989 | Gluntz | G21C 15/18 376/298 |
| 5,268,942 | A | 12/1993 | Newton et al. | |
| 8,638,898 | B2 | 1/2014 | Malloy | |
| 10,553,322 | B2 | 2/2020 | Hosseini et al. | |
| 10,706,973 | B2 | 7/2020 | Hunt et al. | |
| 2019/0006052 | A1 | 1/2019 | Hunt et al. | |
| 2020/0027594 | A1 | 1/2020 | Hunt et al. | |
| 2020/0072087 | A1 | 3/2020 | Kim et al. | |

OTHER PUBLICATIONS

WIPO, Written Opinion in corresponding PCT Application PCT/US2021/064380, dated May 2, 2022.

* cited by examiner

DUAL-MODE HEAT REMOVAL SYSTEM THAT ALLOWS FIRST DIRECTION NATURAL CIRCULATION FLOW THROUGH A HEAT EXCHANGER DURING NUCLEAR REACTOR EMERGENCY COOLING AND ALLOWS OPPOSITE DIRECTION FORCED FLOW THROUGH THE HEAT EXCHANGER DURING DECAY HEAT REMOVAL

BACKGROUND

FIG. 1 is a schematic of a related-art nuclear reactor 10 with isolation condenser system (ICS) 20 used for emergency cooling. As shown in FIG. 1, reactor 10 includes steam outlet 11, such as a main steam leg, receiving heated, higher-pressure coolant from the core of reactor 10. ICS supply line 12 may take this coolant, such as steam, directly at pressure from steam outlet 11 and provide the same to heat exchangers 22 in heat sink 21, such as an ICS pool. The water or other medium in sink 21 may absorb transferred heat and cool and condense the coolant for recirculation back into reactor 10 via ICS condensate return line 13, which may feed into main coolant for reactor 10. A series of pools and exhausts 23 may vent excess heat from heat sink 21 through recirculation and/or evaporative cooling, such that heat exchangers 22 may continuously transfer heat from and/or condense the coolant.

ICS 20 may be used in various reactor designs, each to the effect of preventing overheating and damage of core, reactor 10, and/or all other structures within containment by supplying necessary coolant, removing heat, and/or reducing pressure without requiring active pumping. For example, these and several other auxiliary systems may be used in a related art BWR or ESBWR plant. Related plants are described in "The ESBWR Plant General Description" by GE Hitachi Nuclear Energy, Jun. 1, 2011, incorporated herein by reference in its entirety, and US Patent Publication 2019/0006052 to Hunt et al., published Jan. 3, 2019 and incorporated herein by reference in its entirety.

SUMMARY

Example embodiments include nuclear reactor cooling systems that can operate with coolant flow travelling in different directional paths based on reactor status. The systems include a heat exchanger and a pump on a piping loop that connects to the reactor at two of its ends, so fluid coolant from the reactor can complete a circuit through the heat exchanger and return to the reactor. Both forced and natural circulation can be achieved in the loop, with the pump actively driving the coolant through the loop in forced circulation mode. The coolant direction through the heat exchanger under natural circulation may be opposite its direction through the heat exchanger under forced circulation. The heat exchanger can be part of an ICS or another type of heat exchanger paired with a heat sink, where the hotter side of the loop on one side of the heat exchanger is above the colder side of the loop on the other side of the heat exchanger to set up a natural circulation loop driven by gravity and pressure differential through the reactor and heat exchanger. The pump may be on a parallel recirculation loop with valves or otherwise be isolatable or de-activatable to permit two different flow directions and forced/natural circulations depending on operating mode. Example embodiment systems can be installed directly on existing ICS loops to push liquid coolant in an opposite direction with minimal reconfiguration, providing the ICS with additional cold and hot shutdown functions, beyond transient functionality when the primary, electrical-generating coolant loops are unavailable. No other active, flow-driving components besides the pump are required in example systems, so as to retain passive functionality and safety. Example systems may use high-reliability valves, in series and/or parallel to actuate the system and/or control flow paths, modality, and redundancy through the system.

Example methods include installing a pump in series with a heat exchanger to form an example embodiment system with coolant loop that can be operated in multiple modes. For example, a pump may be installed in an ICS system that will drive coolant in an opposite direction from typical ICS flow. One mode may simply open the piping to allow natural circulation of coolant from the reactor through the heat exchanger, potentially condensing the coolant, and back into the reactor. Another mode may actively drive coolant against gravity the other way through the same heat exchanger and piping. The natural circulation mode may be used prior to or immediately after reactor scram, when coolant density differential is highest and will drive significant natural circulation through the heat exchanger. The forced circulation mode may be used later, when less heat is generated and there is significantly less density differential between incoming and outgoing coolant. Passive and high-reliability valve openings/closing and pump actuation may be the only actions required to move between modes.

BRIEF DESCRIPTIONS OF THE DRAWINGS

Example embodiments will become more apparent by describing, in detail, the attached drawings, wherein like elements are represented by like reference numerals, which are given by way of illustration only and thus do not limit the example embodiments herein.

DETAILED DESCRIPTION

Figure 1:
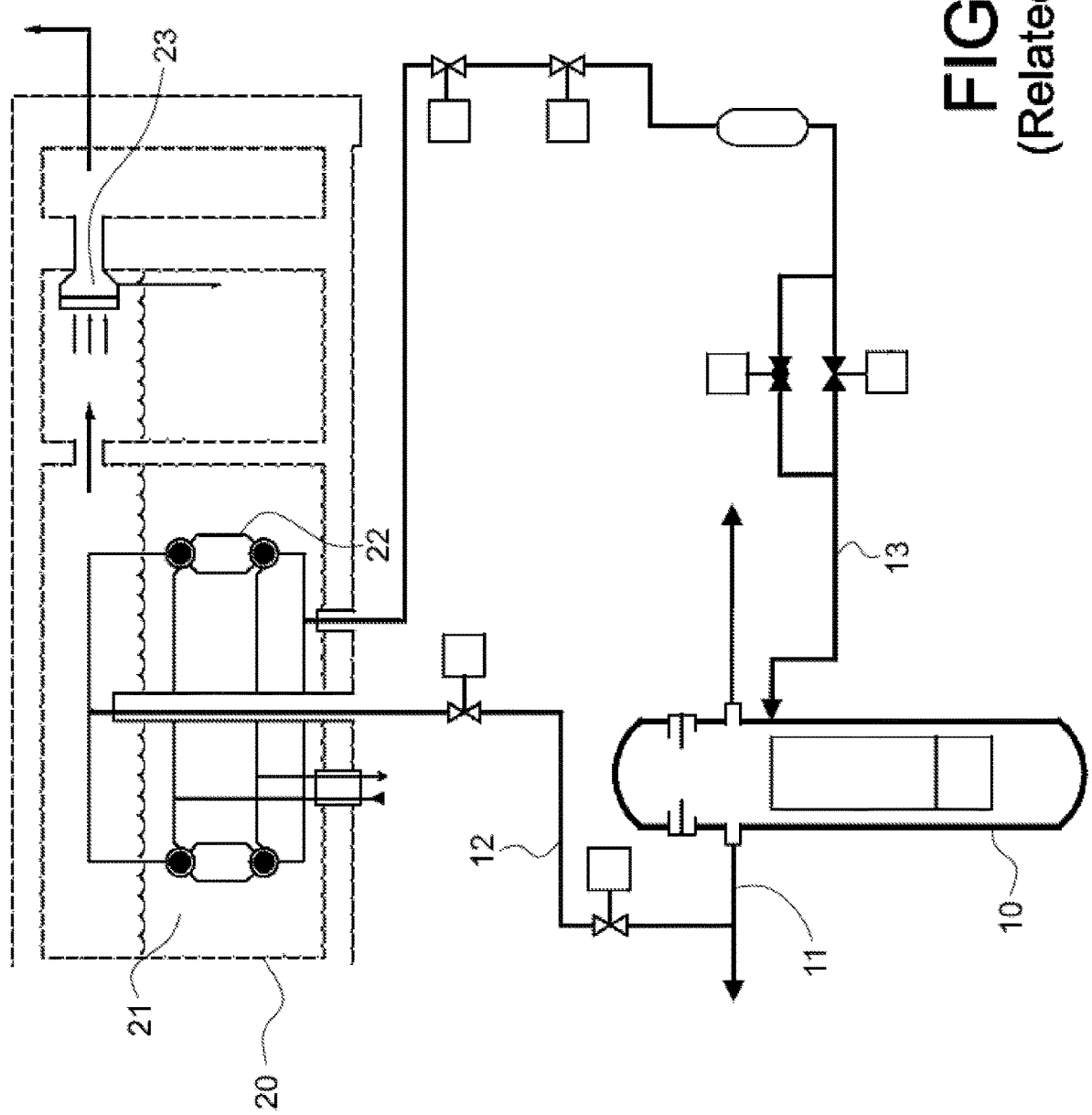
FIG. 1 is a schematic of a related art nuclear reactor with ICS.

Because this is a patent document, general broad rules of construction should be applied when reading it. Everything described and shown in this document is an example of subject matter falling within the scope of the claims, appended below. Any specific structural and functional details disclosed herein are merely for purposes of describing how to make and use examples. Several different embodiments and methods not specifically disclosed herein may fall within the claim scope; as such, the claims may be embodied in many alternate forms and should not be construed as limited to only examples set forth herein.

Modifiers "first," "second," "another," etc. may be used herein to describe various items, but they do not confine modified items to any order or relationship. These terms are used only to distinguish one element from another; where there are "second" or higher ordinals, there merely must be that many number of elements, without necessarily any difference or other relationship between elements. For example, a first element could be termed a second element, and, similarly, a second element could be termed a first element, unless an order or difference is separately stated. In listing items, the conjunction "and/or" includes all combinations of one or more of the associated listed items. The use of "etc." is defined as "et cetera" and indicates the inclusion of all other elements belonging to the same group of the preceding items, in any "and/or" combination(s).

When an element is related, such as by being "connected," "coupled," "mated," "attached," "fixed," etc., to another element, it can be directly connected to the other element, or intervening elements may be present. In contrast, when an element is referred to as being "directly connected," "directly coupled," etc. to another element, there are no intervening elements present. Other words used to describe the relationship between elements should be interpreted in a like fashion (e.g., "between" versus "directly between," "adjacent" versus "directly adjacent," etc.). Similarly, a term such as "communicatively connected" includes all variations of information exchange and routing between two devices, including intermediary devices, networks, etc., connected wirelessly or not.

As used herein, singular forms like "a," "an," and "the" are intended to include both the singular and plural forms, unless the language explicitly indicates otherwise. Indefinite articles like "a" and "an" introduce or refer to any modified term, both previously-introduced and not, while definite articles like "the" refer to the same previously-introduced term. Possessive terms like "comprises," "includes," "has," or "with" when used herein, specify the presence of stated features, characteristics, steps, operations, elements, and/or components, but do not themselves preclude the presence or addition of one or more other features, characteristics, steps, operations, elements, components, and/or groups thereof. Rather, exclusive modifiers like "only" or "singular" may preclude the presence or addition of multiple or other subject matter in modified terms.

As used herein, "axial" and "vertical" directions are the same up or down directions oriented along the major axis of a nuclear reactor, often in a direction oriented with gravity. "Transverse" directions are perpendicular to the "axial" and are side-to-side directions at a particular axial height, whereas "radial" is a specific transverse direction extending perpendicular to and directly away from the major axis of the nuclear reactor.

The structures and operations discussed below may occur out of the order described and/or noted in the figures. For example, two operations and/or figures shown in succession may in fact be executed concurrently or may sometimes be executed in the reverse order, depending upon the functionality/acts involved. Similarly, individual operations within example methods described below may be executed repetitively, individually or sequentially, so as to provide looping or other series of operations aside from single operations described below. It should be presumed that any embodiment or method having features and functionality described below, in any workable combination, falls within the scope of example embodiments.

The inventors have recognized that an isolation condenser system (ICS) for a nuclear reactor is conventionally used only during a transient scenario and becomes unusable in other situations, especially a cold or filled shutdown condition where a pressure gradient between hotter and colder sides of a coolant loop may be unavailable to drive circulation. This requires other, more complex systems, potentially involving remote or large-scale cooling from cooling towers, feedwater, deluge tanks, etc. to be used for other operating conditions, including hot and cold shutdown. The ICS, being a safety system in a large-scale commercial nuclear reactor, cannot be easily modified without concerns for impacts on emergency risk and regulatory compliance. The inventors have recognized the ICS's may be repurposed to provide cooling across several of these operating conditions with minimal complexity. The inventors have developed example embodiments and methods described below to address these and other problems recognized by the Inventors with unique solutions enabled by example embodiments.

The present invention is reactor heat-removal systems operable in different modes and methods of removing heat from a reactor in the different modes. In contrast to the present invention, the few example embodiments and example methods discussed below illustrate just a subset of the variety of different configurations that can be used as and/or in connection with the present invention.

Figure 2:
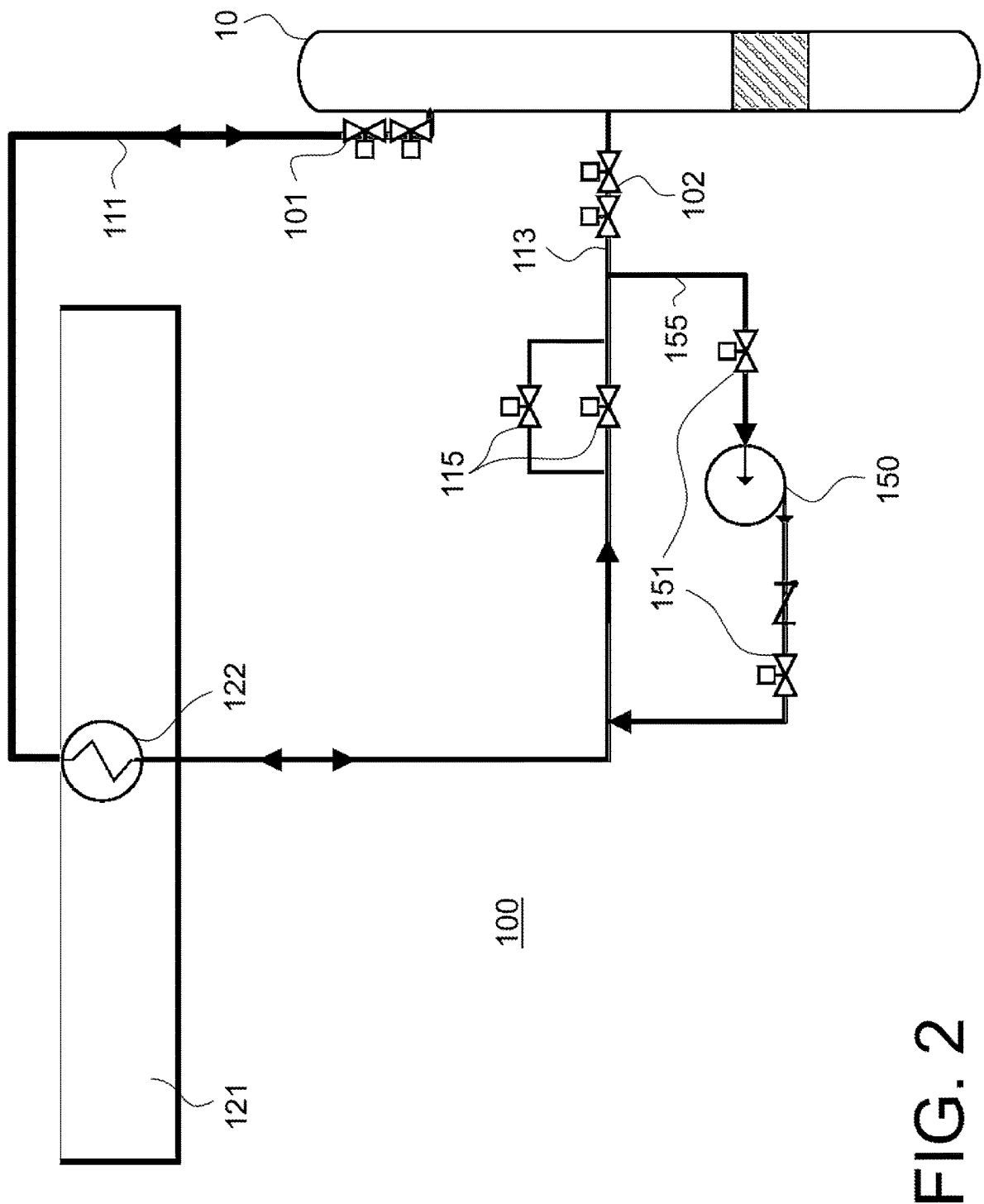
FIG. 2 is a schematic of an example embodiment multi-mode heat removal system for a nuclear reactor.

FIG. 2 is an illustration of an example embodiment multi-mode heat removal system 100 useable with reactor 10. As shown in FIG. 2, system 100 may include several elements similar to or the same as related art ICS system shown in FIG. 1. In this way example embodiment system 100 in a first mode is useable similar to an ICS, such as in a transient scenario where passive coolant condensation and heat removal is necessary or desirable at and immediately following shutdown. In such a first mode, example embodiment system 100 may be configured and operate as an emergency heat sink when coolant, such as feedwater, is unavailable or for example, when the main condenser is unavailable, or as a standard heat sink during a hot shutdown mode, for example.

In this first mode of operation, heated and/or higher-pressure coolant from reactor 10, such as steam, flows into first connection 111 in example embodiment system 100. First connection 111 delivers the coolant to heat exchanger 122 in heat sink 121. Heat sink 121 may be a pool or other heat-absorptive medium, potentially with several gated pools, evaporative coolers, re-circulators, replenishers, etc. that permit potentially unlimited heat sinking capacity for potentially several example embodiment systems and even plants. Another example of a plant and heat sink type useable with example embodiments is described in US Patent Publication 2020/0027594 to Hunt et al. published Jan. 23, 2020 and incorporated by reference herein in its entirety.

Heat exchanger 122 transfers heat from the coolant to sink 121 so as to cool, reduce pressure, and/or increase density of the coolant from reactor 10. Heat exchanger 122 may be a submerged tube-and-manifold vertical loop as shown in FIG. 1, cross-flow tubes, or another type of heat exchanger including those described in the incorporated '052 Publication and U.S. Pat. No. 10,553,322 to Hosseini et al., issued Feb. 4, 2020 and incorporated herein by reference in its entirety. Cooled and/or condensed coolant may then flow, potentially under natural circulation, back into reactor 10 through second connection 113. In this first mode, valves 115, 101, and 102 may be open, and valves 151 may be closed.

Because the first mode resembles a related art ICS operation with natural circulation driven by pressure and height differentials between hot and cold sides of the circulation loop, it may equally be useable in emergency or hot shutdown situations for reactor 10. For example, heat exchanger 122 receiving steam may be axially above second connection 113 returning condensed reactor water with respect to reactor 10, such that a loop of natural circulation cooling is established through reactor 10 with no pumps or other active components required.

Example embodiment system 100 has a second mode of operation and configuration that may use forced circulation. As seen in FIG. 2, recirculation pump 150 is provided in a recirculation leg 155 off of second connection 113. Pump 150 may draw coolant from reactor 10 through second connection 113 and drive the coolant through heat exchanger 122 where it is cooled by heat sink 121. Coolant then feeds back through first connection 111 into reactor 10, forming a reverse loop from the first mode. In this second mode, valves 101, 102, and 151 may be open, and valves 115 may be closed. While pump 150 is shown in a separate recirculation leg 155, it is understood that pump 150 could be strictly on second connection 113 and permit or even force coolant flow in two different directions, depending on mode.

The second mode may provide forced circulation of coolant from reactor 10 and may be particularly useful during cold shutdown when reactor 10 is generating substantially less heat and may be flooded with liquid coolant up to or above a level of second connection 113, and even potentially up to or above first connection 111. In this way, recirculation pump 150 may pump liquid coolant, such as reactor water, for cooling to remove residual decay heat through heat exchanger 122. Pump 150 may be sized and rated for pumping volumes necessary for heat removal from cold shutdowns, or portions thereof if multiple example systems are used with a single reactor, allowing relatively smaller, simpler, and higher-reliability pumps and recirculation loops 155 to be useable in example system 100. Pump 150 and/or valves 151 may be the only active components, or only components powered with moving parts that force circulation of the coolant, in example system 100 and may be operable with a local battery, plant-generated power, and/or grid or other offsite electricity. The second mode may be particularly useful when a reactor has been shutdown and depressurized/opened for construction, maintenance, decommissioning, and/or refueling.

Several different valve options are useable for valves 101, 102, 115, and 151, including check, swing, gate, explosive, integral, solenoid-activated, etc. valves. Connection isolation valves 101 and 102, which may be used for isolation of example embodiment system 100, may be existing valves on an ICS line or other reliable and redundant valves, including integral valves, which have material continuity with, and no internal material division or risk of failure from, reactor 10 as described in U.S. Pat. No. 10,706,973 to Hunt et al., issued Jul. 7, 2020 and incorporated herein by reference in its entirety. When shut, valves 101 and 102 isolate and prevent operation of system 100 and may be used to isolate the system in the instance of breakage or leak anywhere in the ICS and/or to prevent loss of reactor heat through system 100. Otherwise, valves 101 and 102 may remain open by default, allowing valves 115 and/or 151 to control operation and mode of system 100 and how/if coolant flows through system 100 and transfers heat from reactor 10 to heat sink 121.

Some valves may be in parallel, like valves 115, to ensure operation even if one valve should fail close. For example, if one of valves 115 fails to open and only one valve 115 opens, the first mode of operation and natural circulation may be actuated in example system 100. Some valves may be in series, like valves 151, to prevent operation even if one valve should fail. Valves may further include check valve elements like valve 151 to allow only one-way coolant flow, such as only flow through pump 150 toward heat exchanger 122 in recirculation loop 155.

Example embodiment system 100 may be installed at any juncture where multi-directional coolant heat removal flow paths are desired. This may include a first connection 111 at a higher axial position and receiving hotter or less dense coolant than a second flow path 113 at a lower axial position and receiving colder or denser coolant to drive a natural circulation loop. For example, first connection 111 may be or include parts of a main steam leg, or ICS supply lines, in a BWR or ESBWR reactor. Similarly, second connection 113 may be or include parts of a main feedwater line, or ICS condensate return line, in a BWR or ESBWR reactor. Connections 111 and 113 may feed directly above and/or below a nuclear reactor core or be positioned remotely, such as about a feedwater annulus or above steam drying and separating equipment to provide desired flowpaths through reactor 10.

In this way, example embodiment system may reuse or repurpose several parts of existing plant coolant loops and ICS systems. For example, system 100 could be installed on an existing ICS by adding recirculation loop 155, valves 151, and pump 150 to the existing ICS and configuring valves throughout the system for multi-mode usage. Or, for example, system 100 could be added into an existing BWR by adding substantially all features of FIG. 2 to reactor 10 that has been operated for years. Or, for example, system 100 may be built into new plants and reactors as dedicated components forming a part of the plant's original licensing basis. Example embodiment system 100 may thus permit more and flexible usage of ICS-type flow paths with shared vessel penetrations, eliminating the need for separate hot and cold shutdown systems or emergency and normal reactor cooling systems. Example embodiment system 100 may do so without significant complexification of operations or components, while still permitting existing or backup coolant systems, like main feedwater, GDCS lines, ICS lines, etc. to operate with the reactor.

Figure 3:
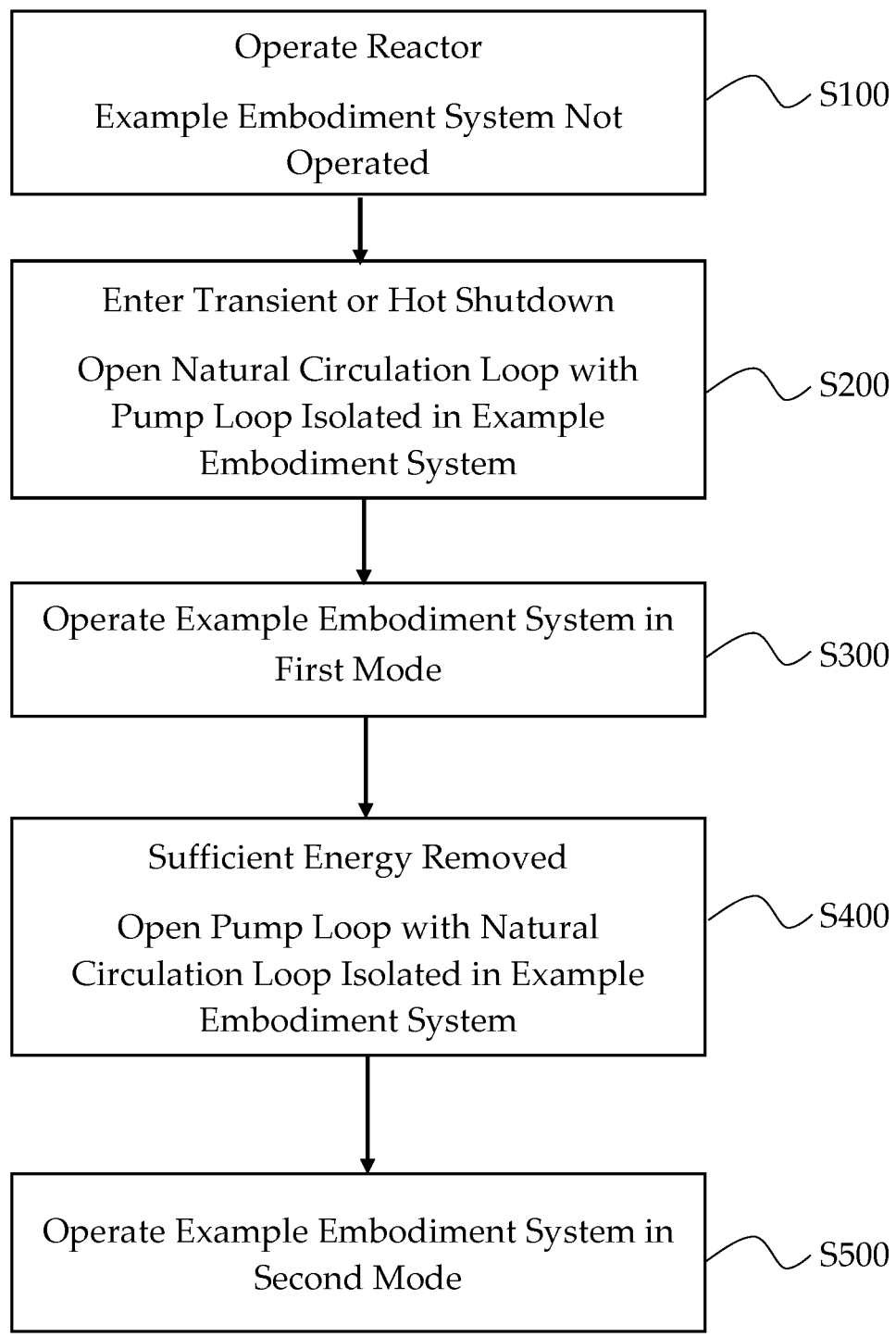
FIG. 3 is a flow chart illustrating an example method of removing heat from a reactor in several modes.

FIG. 3 is a flow chart of an example method of operating a multi-mode heat removal system, including example embodiment system 100. As shown in FIG. 3, in S100, the reactor may be under normal operations, generating large amounts of heat through nuclear fission for eventual extraction for commercial electricity generation. Nuclear fuel under such operations may become particularly enriched with fission and decay products that generate a significant amount of decay heat.

In S200, the reactor enters a state requiring removal of heat through additional or other means, such as during hot shutdown or in a transient scenario involving a loss of feedwater, a generator and turbine trip, loss of offsite power, etc., that will often be accompanied by a reactor scram or an anticipated transient without scram. In S200, large amounts of energy may be generated and the reactor still generates significant amounts of decay heat, potentially a large fraction of its operating energy rating, that must be transferred to the coolant and dissipated. Depending on reactor configuration, this energy may be significant enough to boil the coolant for several days even after fission has largely ceased.

In S200, a natural circulation loop is opened through the multi-mode heat removal system in the first mode. For example, valves 115 in an example embodiment system 100 may be opened, potentially through automatic and/or passive actuation, to allow coolant to flow through already open valves 101 and 102 and heat exchanger 122 in heat sink 121. Similarly, active components, such as pump 150, may be isolated by closed valves 151.

In S300, coolant progresses through the heat removal system, potentially without any pumping or other active component, similar to operation of a related art ICS. The system may operate to remove heat and/or condense coolant as long as heat sink 121 remains available, potentially several days when replenishing and/or recirculation and cooling of heat sink 121 is available. The heat removal system may be duplicated and/or have volume capacity to dissipate all expected decay heat generation in a reactor for several days, keeping fuel submerged or at least below temperatures associated with failure risk. In this way S300 may be executed throughout an entire reactor hot shutdown period or transient with no other coolant available for several days.

In S400, the reactor may be operated in a lower energy mode, such as following sufficient energy removal in a hot shutdown mode or after full transition to a cold shutdown mode, where decay heat has dropped to a level where coolant temperatures are much slower to rise and substantial boiling does not readily occur. In this situation, a natural circulation loop through the heat removal system may be limited or impossible, due to the reactor being opened, the lack of steam generation, and/or an insignificant pressure gradient between hot and cold sides of the system, such as connections 111 and 113. This may occur naturally after a hot shutdown or transient scenario in S300 with adequate cooling for a period of time, such as hours to days.

In S400, the multi-mode heat removal system is reconfigured for active-driven cooling through the same heat loop and heat exchanger, and a recirculation pump for active cooling is actuated. For example, in example embodiment system 100, valves 115 may be closed and valves 151 opened, with pump 150 activated to drive coolant from second connection 113 through recirculation leg 155. Heat exchanger 122 still removes heat from the coolant driven in the reverse direction through it. In S500, the pump is run until forced circulation cooling is no longer required, such as at startup or final decommissioning.

S500 and S400 may be executed directly following S100-S300, offering a seamless transition from emergency or hot shutdown to cold shutdown operations with isolated reactor cooling or in combination with feedwater cooling. For example, switching valves 115 and 151 and pump 150 on or off may allow the system to transition between either mode. S500 and S400 may also be executed separately from S100-S300, such as when other hot shutdown heat removal is available with main recirculation pumps or other coolant systems. Similarly, S200-S300 could be executed alone at any time natural-circulation heat removal is desired or necessary. As another example, S200-S300 may be executed whenever gaseous coolant, such as steam, is present and a natural circulation path with condensation through a heat exchanger is possible, and S400-S500 may be executed whenever liquid coolant is present and a forced circulation path of liquid coolant throughout the system is possible.

Some example embodiments and methods thus being described, it will be appreciated by one skilled in the art that examples may be varied through routine experimentation and without further inventive activity. For example, although a boiling water reactor with specific coolant loops and penetrations is used in some examples, it is understood that other reactors like CANDU, ABWR, PWR, PRISM, etc. are useable with examples. Variations are not to be regarded as departure from the spirit and scope of the example embodiments, and all such modifications as would be obvious to one skilled in the art are intended to be included within the scope of the following claims.

What is claimed is:

1. A heat removal system for a nuclear reactor, the heat removal system comprising:
    a first connection configured to connect to the nuclear reactor;
    a second connection configured to connect to the nuclear reactor,
        wherein the first connection is an Isolation Condenser System (ICS) supply line, and
        wherein the second connection is an ICS condensate return line;
    a heat exchanger connected between the first and the second connections to allow reactor coolant to flow from the nuclear reactor through the first connection, the second connection, and the heat exchanger and back into the reactor; and
    a pump connected to the second connection,
        wherein the pump is configured to
            force circulation of reactor coolant in a first direction through the heat exchanger
            and allow circulation of reactor coolant in a second direction opposite of the first direction through the heat exchanger.

2. The system of claim 1, wherein the heat exchanger is vertically and entirely above the second connection and the pump.

3. The system of claim 2, wherein the heat exchanger includes a manifold and a plurality of vertical tubes configured to carry the reactor coolant and be surrounded by a heat sink.

4. The system of claim 1, further comprising:
    a recirculation loop connecting to and running in parallel with the second connection, wherein the pump connects to the recirculation loop.

5. The system of claim 4, wherein the recirculation loop includes a plurality of valves configured to isolate the recirculation loop and the pump in a first mode of the system and allow forced circulation through the recirculation loop and the pump in a second mode of the system.

6. The system of claim 1, further comprising:
    a heat sink in which the heat exchanger is submerged, wherein the heat sink is an open liquid pool.

7. The system of claim 1, wherein the pump is the only active component of the system configured to force circulation of reactor coolant through the system.

8. The system of claim 1, wherein the first connection includes a series of valves configured to allow or disallow reactor coolant flow through the system, and wherein the second connection includes a series of valves configured to allow or disallow reactor coolant flow through the system and a bank of valves in parallel with the pump.

9. The system of claim 1, wherein the heat exchanger is an ICS isolation condenser submerged in an ICS pool.

10. The system of claim 9, wherein the pump is connected to a recirculation leg in parallel with the condensate return line, and wherein the recirculation leg connects to the condensate return line at two points of the condensate return line.

11. The system of claim 10, wherein the recirculation leg includes a first isolation valve on an intake side of the pump and a second isolation valve on an output side of the pump.

12. The system of claim 9, wherein the isolation condenser includes a manifold and a plurality of vertical tubes immersed in the ICS pool and configured to condense the reactor coolant through heat transfer to the ICS pool.

13. The system of claim 1, further comprising:
    the nuclear reactor.

14. The system of claim 13, wherein the supply line connects to the nuclear reactor vertically above where the condensate return line connects to the nuclear reactor, and wherein the pump and the condensate return line are entirely below an isolation condenser in the ICS.

15. The system of claim 1, further comprising:
the nuclear reactor containing a nuclear core; and
a main steam leg configured to convey energetic reactor coolant from the nuclear reactor for energy extraction, wherein the pump is below a top of the nuclear reactor and the main steam leg and above a bottom of the nuclear reactor.

16. The system of claim 15, wherein the second connection includes at least a portion of a main feedwater line of the nuclear reactor, and wherein the first connection connects to the main steam leg.

17. The system of claim 1, further comprising:
a plurality of valves configured to open and/or close to create a first coolant loop and a second coolant loop, wherein the first and the second coolant loops each provide a flowpath for reactor coolant out of the reactor, through the heat exchanger and the first and the second connections, and back into the reactor, and wherein the first coolant loop includes the pump and the second coolant loop has no pump.

18. The system of claim 1, further comprising:
a recirculation line directly connecting to and in parallel with the second connection, wherein the pump directly connects to only the recirculation line, and wherein the recirculation line includes a check valve allowing reactor coolant only to flow through the pump from the nuclear reactor toward the heat exchanger.

19. The system of claim 1, wherein the second connection ascends vertically and the pump is configured to drive reactor coolant only in a direction away from the nuclear reactor and vertically upward to the heat exchanger through the second connection.

* * * * *